United States Patent
Jin

(10) Patent No.: US 11,832,173 B2
(45) Date of Patent: Nov. 28, 2023

(54) DATA TRANSMISSION METHOD, TERMINAL, AND ACCESS-NETWORK NETWORK ELEMENT

(71) Applicant: HUAWEI TECHNOLOGIES CO., LTD., Guangdong (CN)

(72) Inventor: Weisheng Jin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/468,463

(22) Filed: Sep. 7, 2021

(65) Prior Publication Data

US 2022/0007279 A1 Jan. 6, 2022

Related U.S. Application Data

(63) Continuation of application No. 16/533,039, filed on Aug. 6, 2019, now Pat. No. 11,115,916, which is a
(Continued)

(51) Int. Cl.
*H04W 48/18* (2009.01)
*H04W 76/25* (2018.01)
(Continued)

(52) U.S. Cl.
CPC ........... *H04W 48/18* (2013.01); *H04M 15/66* (2013.01); *H04W 8/08* (2013.01); *H04W 76/11* (2018.02);
(Continued)

(58) Field of Classification Search
CPC ....... H04W 48/18; H04W 8/08; H04W 76/11; H04W 76/25; H04W 80/10; H04W 80/12;
(Continued)

(56) References Cited

U.S. PATENT DOCUMENTS 8,364,717 B2   1/2013  Delling et al.
2004/0184432 A1   9/2004  Gateva et al.
(Continued)

FOREIGN PATENT DOCUMENTS

CN   1559131 A   12/2004
CN   1777180 A   5/2006
(Continued)

OTHER PUBLICATIONS

Samsung, UE policy interface (SA WG2 Meeting #118-BIS S2-170334, Jan. 16-20, 2017 (Year: 2017).*
(Continued)

*Primary Examiner* — Yaotang Wang
(74) *Attorney, Agent, or Firm* — Paul Christopher Hashim

(57) ABSTRACT

A data transmission method, a terminal, and an access-network network element are disclosed. An interface is disposed on a policy client of UE and an operating system or an application layer of the UE. The interface is used to provide the operating system or the application layer with a policy related to the operating system or the application layer, and collect, from the operating system or the application layer, information required for a report. In this way, a dedicated transport channel is implemented by a bottom layer of the UE, reports and policies are transmitted on the dedicated transport channel, and during implementation, a protocol is not coupled with the application layer or the operating system, so that the system is simple to implement.

4 Claims, 8 Drawing Sheets

Related U.S. Application Data continuation of application No. PCT/CN2017/073064, filed on Feb. 7, 2017.

(51) Int. Cl.
*H04W 76/11* (2018.01)
*H04M 15/00* (2006.01)
*H04W 8/08* (2009.01)
*H04W 80/10* (2009.01)
*H04W 80/12* (2009.01)

(52) U.S. Cl.
CPC ........... *H04W 76/25* (2018.02); *H04W 80/10* (2013.01); *H04W 80/12* (2013.01)

(58) Field of Classification Search
CPC ..... H04W 24/10; H04W 48/16; H04W 80/08; H04W 88/06; H04W 8/14; H04W 76/10; H04W 88/02; H04W 88/14; H04M 15/66
See application file for complete search history.

(56) References Cited

U.S. PATENT DOCUMENTS

| | | | |
|---|---|---|---|
| 2010/0115117 A1* | 5/2010 | Diab | G06F 1/3234 709/230 |
| 2012/0192249 A1 | 7/2012 | Raleigh | |
| 2013/0252578 A1 | 9/2013 | So et al. | |
| 2014/0079016 A1 | 3/2014 | Dai et al. | |
| 2015/0304736 A1 | 10/2015 | Lal et al. | |
| 2015/0341830 A1 | 11/2015 | Jeong et al. | |
| 2019/0208402 A1* | 7/2019 | Qu | H04M 15/00 |
| 2019/0357130 A1* | 11/2019 | Garcia Azorero | H04W 8/08 |
| 2019/0394651 A1* | 12/2019 | Wifvesson | H04W 28/18 |

FOREIGN PATENT DOCUMENTS

| | | |
|---|---|---|
| CN | 101877706 A | 11/2010 |
| CN | 102026289 A | 4/2011 |
| CN | 102835071 A | 12/2012 |
| CN | 103416017 A | 11/2013 |
| CN | 104349269 A | 2/2015 |
| EP | 3567934 A1 | 11/2019 |
| WO | 2011123806 A2 | 10/2011 |

OTHER PUBLICATIONS

3GPP TS 23.501 v0.2.0 (Jan. 2017) System Architecture for the 5G System Stage 2 (Release 15), pp. 11-42 (Year: 2017).*
Samsung, U E policy interface, SA WG2 Meeting #118-BIS S2-170334, 16 Jan. 20, 2017 (Year: 2017).
"3GPP TS 23.501 V0.2.0 (Jan. 2017), 3rd Generation Partnership Project; Technical Specification Group Services and System Aspects; System Architecture for the 5G System; Stage 2(Release 15), 69 pages".
"3GPP TS 23.502 V0.1.1 (Jan. 2017), 3rd Generation Partnership Project; Technical Specification Group Services and System Aspects; Procedures for the 5G System; Stage 2; (Release 15), 46 pages".
Huawei, HiSilicon, High level description on policy functions. SA WG2 Meeting #118bis Jan. 16-20, 2017, Spokane, US, S2-170122, 2 pages.
Huawei, HiSilicon, Service based procedures on Policy Control. SA WG2 Meeting #118bis Jan. 16-20, 2017, Spokane, US, S2-170123, 10 pages.
Samsung, UE policy interface. SA WG2 Meeting #118-BIS Jan. 16-20, 2017 Spokane, WA, USA, S2-170334, 6 pages.
Motorola Mobility, Lenovo, Policy interface to UE. SA WG2 Meeting #118bis Jan. 16-20, 2017, Spokane, WA, USA, S2-170448, 2 pages.
SA WG2 Meeting #118bis, S2-170409, Motorola Mobility, Lenovo:"Policy interface to UE", Jan. 16-20, 2017, Spokane, WA, USA, total 2 pages. XP051216633.
3GPP TR 23.799 V14.0.0 (Dec. 2016),3rd Generation Partnership Project; Technical Specification Group Services and System Aspects;Study on Architecture for Next Generation System(Release 14),total 522 pages. XP051230010.

\* cited by examiner

DATA TRANSMISSION METHOD, TERMINAL, AND ACCESS-NETWORK NETWORK ELEMENT

CROSS-REFERENCE TO RELATED APPLICATIONS

This application is a continuation of U.S. patent application Ser. No. 16/533,039, filed on Aug. 6, 2019, which is a continuation of International Application No. PCT/CN2017/073064, filed on Feb. 7, 2017. All of the aforementioned patent applications are hereby incorporated by reference in their entireties.

TECHNICAL FIELD

This disclosure relates to the communications field, and in particular, to a data transmission method, a terminal, and an access-network network element.

BACKGROUND

In a 3GPP (the $3^{rd}$ generation partnership project) communications system, both generation and delivery of a policy by a network side are implemented on an application layer. A network selection policy is used as an example. UE (user equipment) supports a plurality of access networks. For example, the UE supports access to a WLAN (wireless local area network) and a cellular network. To reduce a delay of the UE in accessing a network, an ANDSF (access network discovery and selection function) network element is defined for an SAE (system architecture evolution) network. The ANDSF network element may formulate an optimal network selection policy for the UE based on information such as a location reported by the UE and a user preference, and assist the UE in selecting a suitable access network.

In a current policy delivery solution, a policy server is deployed in a core network, and communicates, through an S14 interface, with a policy client deployed in the UE. The S14 interface is an interface implemented on an IP layer, and the S14 interface is generally implemented by using an OAM-DM (open mobile alliance-device management) protocol. This requires deployment of the policy client on an application layer of the UE and deployment of the policy server on a network-side application layer. The policy client and the policy server transmit a policy and a report transparently. From the foregoing description, it is learned that reception and execution of a policy requires support from an operating system and the application layer of the UE, and the implementation process is complex. In addition, due to differences in the operating system and the application layer between various manufacturers, it is difficult to perform unified upgrading and extension.

SUMMARY

A technical problem to be resolved by embodiments of this disclosure is to provide a data transmission method, a terminal, and an access-network network element, to overcome complexity of a process of delivering and executing a policy and poor extensibility in the prior art.

According to a first aspect, an embodiment of the present disclosure provides a data transmission method. In the method, a hierarchy of UE is divided into an application layer, an operating system, and a hardware layer from top downward. The hardware layer includes but is not limited to a memory, a processor, a modem, a baseband chip, and a transceiver. The operating system is run on the hardware layer, and the application layer includes a variety of applications, and the applications may invoke hardware resources and software resources of the UE by using the operating system. The hardware layer of the UE receives a policy sent by a PCF (policy control function), and the hardware layer of the UE executes the policy, where a path through which the PCF sends the policy to the UE is not limited in this embodiment of the present disclosure. For example, the PCF delivers the policy to the UE by using an SMF (session management function), a UPF (user plane function), and an AN (access network) sequentially. For another example, the PCF sends the policy to the UE by using the SMF, an AMF, and the AN sequentially. Specifically, the policy may be delivered through an established dedicated transport channel or by using NAS (non-access stratum) signaling to carry the policy, or in other manners. This is not limited in this embodiment of the present disclosure.

In a possible implementation, the PCF may deliver the policy of the UE to the UE by using the AMF, and a specific process thereof may be: The PCF sends the policy of the UE to the AMF, and marks a priority for the policy of the UE, and based on the priority, the PCF differentially processes the policy when sending the policy to the UE by using the NAS, for example, the priority of sending the policy is lower than that of sending a mobility management message and/or a session management message. Alternatively, based on a fact that the policy comes from the PCF, the AMF determines the priority of the policy sent to the UE, for example, the priority of sending the policy is lower than that of sending a mobility management message and/or a session management message.

In the foregoing embodiment, the UE receives, on the hardware layer, the policy delivered by the PCF and executes the policy; and reception and execution of the policy are not coupled with the operating system, so that it is convenient to receive and execute the policy in different types of terminals and reduce difficulty of implementation.

In a possible implementation of this aspect, a dedicated transport channel is established between the UE, the AN, and the UPF. The dedicated transport channel is used only to transmit a policy and a report, and cannot be used to transmit service data. That is, the dedicated transport channel transmits reports in an uplink direction and policies in a downlink direction, where the uplink direction is from the UE to a core network, and the downlink direction is from the core network to the UE.

In a possible implementation of this aspect, the dedicated transport channel is a PDU session or NAS signaling. That is, a PDU session is established between the UE and the UPF, the PDU session is established as triggered by the UE, and the PDU session is terminated at the UPF. The PDU session established by the UE is used only to transmit a policy and a report, or the PCF sends to the UE the NAS signaling that is used to dedicatedly transmit the policy and the report.

In a possible implementation of this aspect, the UE triggers the establishment of the dedicated transport channel, and the UE may trigger the establishment of the dedicated transport channel in an attach procedure, by a user, and on an application layer. A network-side device may also trigger the establishment of the dedicated transport channel. After establishing the dedicated transport channel, the SMF sends indication information to the UE. The indication information is used to indicate a type of the dedicated transport channel.

Based on the indication information, the UE determines the dedicated transport channel that is used to transmit the policy and the report.

In a possible implementation of this aspect, the policy includes one or more of a network selection policy, a route selection policy, a slice selection policy, a work mode selection policy, a session continuity policy, and an information reporting policy. The network selection policy is a policy for the UE to select an access network. The access network includes but is not limited to one or more of a WLAN, a 3G access network, and a 4G access network. The work mode policy is a policy for the UE to select a work mode. The work mode includes an IoT (Internet of things) work mode, and an MBB (mobile broadband service) work mode. The route selection policy is a policy of selecting a path for forwarding a message. The slice selection policy is a policy for the UE to select a slice in the core network, or a policy for an application in the UE to select a slice in the core network. The information reporting policy is a policy for the UE to report information, and specifically, may be an execution policy of reporting the information.

In a possible implementation of this aspect, the executing, by the UE, the policy includes: if the policy is an information reporting policy, receiving, by the UE, the information reporting policy delivered by the PCF. The information reporting policy includes a reporting condition and report content, the reporting condition is used to indicate a trigger condition of performing reporting by the UE, and the report content is used to indicate a type of information to be reported by the UE. The UE obtains a parameter value of the report content, generates a report based on the parameter value, and sends the report to a network-side device if the reporting condition is satisfied. The network-side device may be any one of an AN, a UDM (unified data management), or an SMF. The information reporting policy may further include a reporting target, where the reporting target is a destination network element of the information to be reported. The information reporting policy may further include a reporting frequency, and the reporting frequency is a quantity of times the information is reported within a designated time.

In a possible implementation of this aspect, the report content includes one or more of a terminal location, a speed, a hardware status, an application status, and a network resource occupation status.

In a possible implementation of this aspect, the policy is a slice selection policy, the slice selection policy includes a trigger condition and a slice identifier, and the trigger condition includes one or more of a designated location, a designated access network type, and a designated time period; and the executing, by the UE, the policy includes: accessing, by the UE, a slice corresponding to the slice identifier, if the trigger condition is satisfied.

In a possible implementation of this aspect, the policy is a slice selection policy, the slice selection policy includes a trigger condition, a slice identifier, and an application identifier, and the trigger condition includes one or more of a designated location, a designated access network type, and a designated time period; and the executing, by the UE, the policy includes: instructing, by the UE if the trigger condition is satisfied, an application corresponding to the application identifier to access a slice corresponding to the slice identifier.

In a possible implementation of this aspect, the policy is a session continuity policy, the session continuity policy includes a trigger condition, a session and service continuity SSC mode identifier, and an application identifier, and the trigger condition includes one or more of a designated location, a designated access network type, and a designated time period; and the executing, by the UE, a policy includes: instructing, by the UE if the trigger condition is satisfied, an application corresponding to the application identifier to associate with an SSC mode corresponding to the SSC mode identifier.

According to a second aspect, an embodiment of this disclosure provides a data transmission method, including: receiving, by a UPF, a policy of UE sent by a PCF; determining, by the UPF, a dedicated transport channel; and loading, by the UPF, the policy to the dedicated transport channel and sending the channel to the UE, where the dedicated transport channel is used to transmit the policy of the UE.

In a possible implementation of this aspect, the determining, by the UPF, a dedicated transport channel includes: determining, by the UPF, the dedicated transport channel based on indication information sent by an SMF.

In a possible implementation of this aspect, the second aspect further includes: extracting, by the UPF from the dedicated transport channel, a report reported by the UE, and forwarding, by the UPF, the report to a UDM; forwarding, by the UPF, the report to the PCF by using the SMF; or forwarding, by the UPF, the report to the PCF directly.

In a possible implementation of this aspect, the policy includes one or more of a network selection policy, a route selection policy, a slice selection policy, a work mode selection policy, a session mode selection policy, and an information reporting policy.

According to a third aspect, an embodiment of this disclosure provides a data transmission method, including: determining, by an AN, a dedicated transport channel; receiving, by the AN, a policy of UE delivered by a core-network network element; and delivering, by the AN, the policy to the UE through the dedicated transport channel; or receiving, by an AN, a policy of UE that is delivered by a core-network network element through a dedicated transport channel; modifying, by the AN, the policy; and delivering, the AN, the modified policy to the UE through the dedicated transport channel.

In a possible implementation of this aspect, the AN determines the dedicated transport channel based on indication information sent by an AMF.

In a possible implementation of this aspect, the AN receives a report that is sent by the UE through the dedicated transport channel, where the report includes at least one network element identifier and a parameter value associated with each network element identifier; and the AN extracts, from the report, a parameter value associated with an identifier of the AN.

In a possible implementation of this aspect, if the at least one network element identifier includes another network element identifier other than the identifier of the AN, the AN sends the report to a network element indicated by the another network element identifier.

According to a fourth aspect, an embodiment of this disclosure provides a data transmission method, including: generating, by a PCF, a policy of UE; sending, by the PCF, the policy to a UPF, and instructing the UPF to load the policy to a dedicated transport channel and send the channel to the UE or an AN, where the policy of the UE may be generated by the PCF, or customized by another core-network network element.

In a possible implementation of this aspect, the generating, by a policy control function PCF, a policy of a terminal UE includes:

receiving, by the PCF, a policy customized by an NEF;
receiving, by the PCF, a policy customized by an AF;
receiving, by the PCF, a policy customized by a UDM; or
receiving, by the PCF, a policy customized by an SMF.

According to a fifth aspect, an embodiment of this disclosure provides a terminal, including a memory and a processor. The memory stores program code, and the processor invokes the program code to perform the data transmission method according to any one of the first aspect to each possible implementation of the first aspect.

According to a sixth aspect, this disclosure provides a computer readable storage medium, the computer readable storage medium stores one or more computer programs, and a terminal performs the data transmission method according to the first aspect by running the one or more computer programs.

According to a seventh aspect, an embodiment of this disclosure provides a core-network network element, the core-network network element is a UPF, and the core-network network element includes a memory and a processor. The memory stores program code, and the processor invokes the program code to perform the data transmission method according to any one of the second aspect to each possible implementation of the second aspect.

According to an eighth aspect, this disclosure provides a computer readable storage medium, the computer readable storage medium stores one or more computer programs, and a core-network network element performs the data transmission method according to any one of the second aspect to each possible implementation of the second aspect by running the one or more computer programs.

According to a ninth aspect, an embodiment of this disclosure provides an access-network network element, including a memory and a processor. The memory stores program code, and the processor invokes the program code to perform the data transmission method according to any one of the third aspect to each possible implementation of the third aspect.

According to a tenth aspect, this disclosure provides a computer readable storage medium, the computer readable storage medium stores one or more computer programs, and an access-network network element performs the data transmission method according to any one of the third aspect to each possible implementation of the third aspect by running the one or more computer programs.

According to an eleventh aspect, an embodiment of this disclosure provides a core-network network element, the core-network network element is a PCF, and the core-network network element includes a memory and a processor. The memory stores program code, and the processor invokes the program code to perform the data transmission method according to any one of the fourth aspect to each possible implementation of the fourth aspect.

According to a twelfth aspect, this disclosure provides a computer readable storage medium, the computer readable storage medium stores one or more computer programs, and a core-network network element performs the data transmission method according to any one of the fourth aspect and each possible implementation of the fourth aspect by running the one or more computer programs.

BRIEF DESCRIPTION OF DRAWINGS

To describe the technical solutions in the embodiments of this disclosure or in the background more clearly, the following briefly describes the accompanying drawings required for describing the embodiments of this disclosure or the background.

DESCRIPTION OF EMBODIMENTS

The following describes embodiments of this disclosure with reference to the accompanying drawings in the embodiments of this disclosure.

Figure 1A:
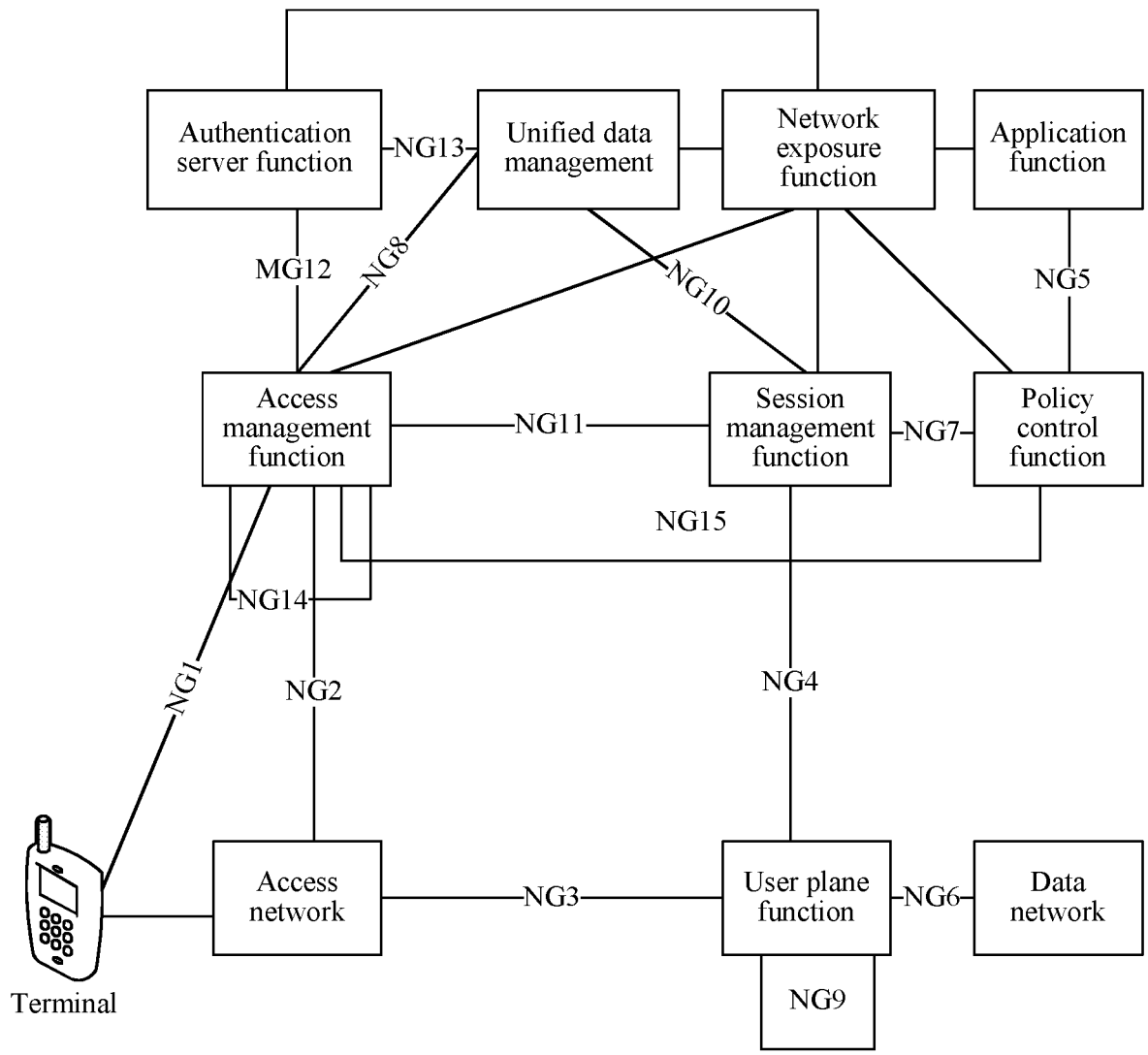
FIG. 1a is a schematic structural diagram of a next-generation communications system according to an embodiment of this disclosure.

FIG. 1a is a schematic structural diagram of a next-generation communications system according to an embodiment of this disclosure. The next-generation communications system includes a core network, an access network (AN), and a terminal. The terminal includes, but is not limited to, a mobile station, user equipment, a tablet computer, and a personal digital assistant. In this disclosure, user equipment is used as an example of the terminal. The access network may include a variety of access-network network elements. For example, the access-network network elements include a base station, a wireless AP (Access Point), and a home NodeB. The core network includes an authentication server function (ASF), unified data management (UDM), a network exposure function (NEF), an application function (AF), an access management function, a session management function, a policy control function (PCF), a user plane function (UPF), and a data network (DN). An interface between network elements in the next-generation communications system is shown in FIG. 1a, and is not repeatedly detailed herein. It should be noted that different core-network network elements in the core network may be connected by using a bus, or may be connected in other manners. This is not limited in the embodiments of this disclosure.

Figure 1B:
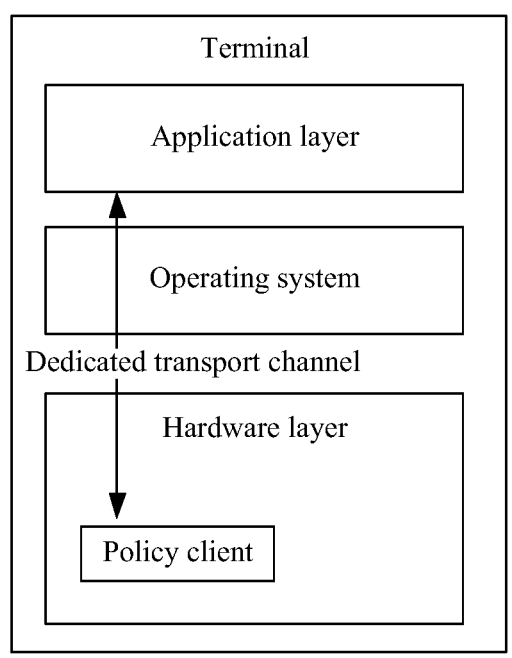
FIG. 1b is a schematic structural diagram of a terminal according to an embodiment of this disclosure.

FIG. 1b is a schematic structural diagram of UE according to an embodiment of this disclosure. The UE may include an application layer, an operating system, and a hardware layer from top downward. In one embodiment, the hardware layer may be implemented by using a baseband chip. A policy client is disposed on the hardware layer. A PDU session may be established between the UE, an AN, and a UPF. The PDU session is a dedicated transport channel that is used to dedicatedly transmit a policy and a report. After a network side or the UE triggers establishment of a PDU session, the policy client of the UE is bound to the established PDU session, and the policy client is responsible for sending a report through the PDU session or receiving a policy through the PDU session, and executing the policy. The establishment of the PDU session may be triggered by an AMF by sending a session establishment request to the UE through an NG1 interface, or may be triggered by the UE in initiating an attach procedure.

In one embodiment, an interface is disposed on the policy client and the operating system or the application layer of the UE. The interface is used to provide the operating system or the application layer with a policy related to the operating system or the application layer, and collect, from the operating system or the application layer, information required for the report. For example, the collected information includes but is not limited to one or more of a speed, a temperature, and a battery consumption speed. If a reporting condition is satisfied, a reported is generated and sent to the network side.

In the foregoing embodiment, the dedicated transport channel is implemented by a bottom layer of the UE, reports and policies are transmitted on the dedicated transport channel, and during implementation, a protocol is not coupled with the application layer or the operating system, so that the system is simple to implement.

Figure 2:
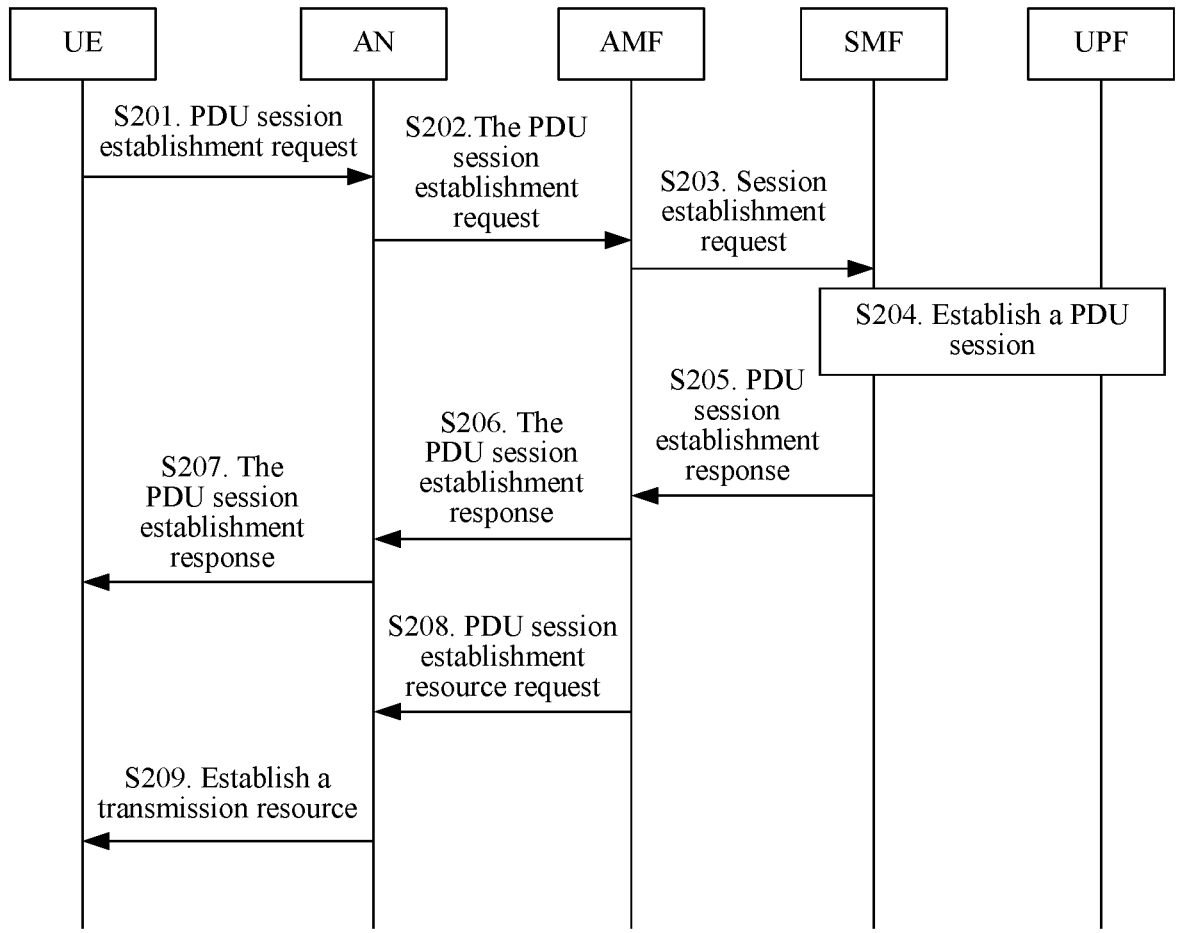
FIG. 2 is a schematic flowchart of a data transmission method according to an embodiment of this disclosure.

FIG. 2 is a schematic flowchart of a data transmission method according to an embodiment of this disclosure. The method includes but is not limited to the following operations.

Operation S201. UE sends a PDU session establishment request to an AN. The PDU session establishment request carries indication information, and the indication information is used to indicate that a PDU session to be established is used to transmit a policy and a report. In one embodiment, the indication information is further used to indicate that the PDU session to be established cannot be used to transmit service data. In one embodiment, in the PDU session establishment request, a field, for example, Data Network Name=Policy, is added. The added field is used to indicate that the PDU session established according to the PDU session established request is a dedicated transport channel, and the dedicated transport channel is used to dedicatedly transmit a policy and a report. Correspondingly, if a network element that receives the PDU session established request learns Data Network Name=Policy through parsing, it is determined that the PDU session established according to the PDU session established request is a dedicated transport channel, and the dedicated transport channel is used to dedicatedly transmit a policy and a report.

Operation S202. The AN forwards the PDU session establishment request to an AMF.

Operation S203. The AMF selects an SMF and sends the PDU session establishment request to the SMF.

In one embodiment, the AMF receives the PDU session establishment request, and determines, based on the indication information carried in the PDU session establishment request, that the PDU session to be established is used to transmit a policy and a report and not used to transmit service data. The AMF determines an associated SMF, and forwards the PDU session establishment request to the SMF.

Operation S204. Establish a PDU session.

In one embodiment, the SMF receives the PDU session establishment request, and determines, based on the indication information carried in the PDU session establishment request, that the PDU session to be established is used to transmit a policy and a report and not used to transmit service data. The SMF instructs a UPF to allocate a time-frequency resource for the PDU session, and the UPF establishes the PDU session based on the allocated time-frequency resource. In this way, the PDU session used to dedicatedly transmit a policy and a report is established between the UE, the AN, and the UPF. The SMF notifies that the PDU session established by the UPF is used to transmit a policy and a report and not used to transmit service data. For the established PDU session, the UPF needs to perform the following operation that is different from an operation on an ordinary PDU session: The UPF loads a policy to the PDU session and delivers the session to the UE, and extracts a report from the PDU session and sends the report to a network-side device.

Operation S205. The SMF returns a PDU session establishment response to the AMF. The PDU session establishment response indicates that the PDU session is established successfully. In one embodiment, the PDU session establishment response carries indication information, and the indication information is used to indicate that the established PDU session is a dedicated transport channel used to transmit a policy and a report.

Operation S206. The AMF sends the PDU session establishment response to the AN.

In one embodiment, the AN determines, based on the indication information carried in the PDU session establishment response, that the established PDU session is a dedicated transport channel used to transmit a policy and a report.

Operation S207. The AN sends the PDU session establishment response to the UE. In one embodiment, the UE determines, based on the indication information carried in the PDU session establishment response, that the established PDU session is a dedicated transport channel used to transmit a policy and a report. The UE sends reports and receives policies through the established PDU session.

Operation S208. The AMF sends a PDU session establishment resource request to the AN. The PDU session establishment resource request carries indication information. The AN determines, based on the indication information, that the established PDU session is a dedicated transport channel used to transmit a policy and a report. For the established PDU session, the AN performs an operation different from the operation on the ordinary PDU session: The AN loads a policy to the established PDU session and sends the session to the UE, and extracts a report from the PDU session and sends the report to a corresponding network element.

Operation S209. Establish an air interface transmission resource between the AN and the UE.

By implementing the foregoing embodiment, the PDU session that is used to dedicatedly transmit a policy and a report is established between the UE, the AN, and a core-network network element to share a transport channel. In addition, the AN participates in formulation of the policies, and can receive, through a non-control plane, the reports sent by the UE, thereby improving efficiency and flexibility of policy delivery and report reporting.

Figure 3:
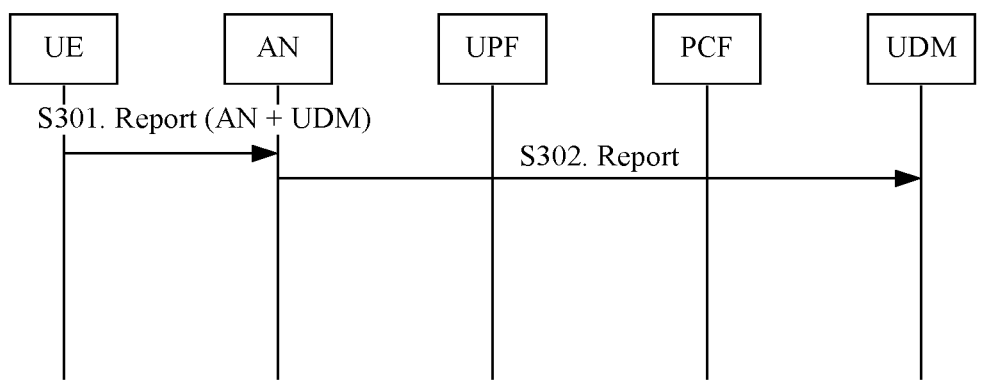
FIG. 3 is another schematic flowchart of a data transmission method according to an embodiment of this disclosure.

FIG. 3 is another schematic flowchart of a data transmission method according to an embodiment of this disclosure. The method includes but is not limited to the following operations.

Operation S301. UE sends a report to an AN.

The report may carry one or more of a message sequence number, a priority, a sender, a receiver, and report content. The message sequence number is a sequence number of the report; and the priority is a priority of the report. The UE, the AN, or another network element may differentially transmit and process the report based on the priority, for example, transmit and process a report of a higher priority preferentially against a report of a lower priority. The sender is a sender of the report. In one embodiment, the sender includes an original sender. In one embodiment, if the report is transmitted through an intermediate node and modified by the intermediate node, the senders may also include the intermediate node. The receiver is a destination network element of the report. There may be one or more destination network elements. The report content is a type of a parameter that needs to be reported, and the report content includes but is not limited to one or more of a location, a speed, a hardware status, and an application status. For example, the hardware status includes one or more of a remaining battery, a battery consumption speed, a battery temperature, a battery temperature change speed, a CPU usage ratio, and a memory usage ratio. The application status includes a remaining buffer and/or a running status. The running status includes a foreground running state and a background running state.

For example, receivers carried in the report include the AN and a UDM, and the UE sends the report to the AN first.

Operation S302. After receiving the report sent by the UE, the AN sends the report to a UDM.

For example, the AN receives the report sent by the UE, parses the report and learns that the receivers carried in the report are the AN and the UDM. The AN stores the report, the AN determines that the receivers further include the UDM, the AN sends the report to the UDM, and the UDM receives and stores the report. In one embodiment, different network elements of a core network are connected by using a bus, and the AN may send the report to the UDM through a PDU session. The PDU session used to dedicatedly transmit a policy and a report is established between the UE, the AN, and a UPF, and the UPF extracts the report from the PDU session, and parses the report to learn senders carried in the report. In one embodiment, if the sender is any one of an AMF, an SMF, the UDM, a PCF, or an NEF, the UPF will re-encapsulate the report and sends the report to the bus through a control plane interface, or the UPF directly sends the encapsulated report to a corresponding destination network element, or the UPF sends the encapsulated report to a corresponding destination network element by using the SMF or by using the SMF and the PCF.

In the foregoing embodiment, the transport channel that is used to transmit a policy and a report between the UE, the AN, and a core-network network element is shared by using the bus, thereby improving efficiency and flexibility of policy delivery and report reporting.

Figure 4:
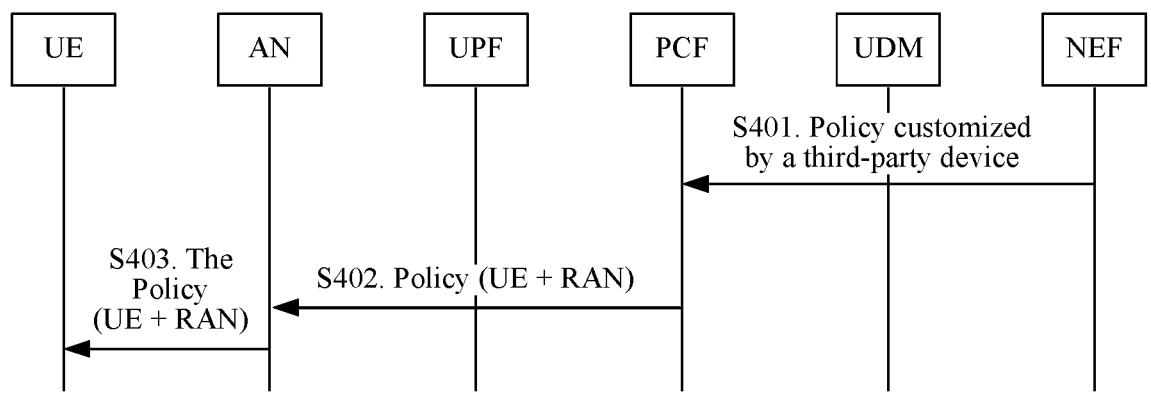
FIG. 4 is another schematic flowchart of a data transmission method according to an embodiment of this disclosure.

FIG. 4 is a schematic flowchart of a data transmission method according to an embodiment of this disclosure. In this embodiment of this disclosure, the method includes the following operations.

Operation S401. An NEF sends, to a PCF, a policy customized by a third-party device.

In one embodiment, the third-party device includes but is not limited to one or more of an AMF, an SMF, a UDM, and an AF. In one embodiment, the policy may carry one or more of a message sequence number, a priority, a sender, a receiver, and report content. The message sequence number is a sequence number of the policy, and the priority is a priority of a report. Based on the priority, the UE, the AN, or another network element transmits and processes the policy differentially, for example, transmits and processes a report of a higher priority preferentially against a policy of a lower priority. The sender is a sender of the policy. The sender includes an original sender. If the policy is transmitted by using an intermediate node and modified by the intermediate node, the senders may also include the intermediate node. The receiver is a destination network element of the policy. There may be one or more of destination network elements. Types of the policy include but are not limited to one or more of a network selection policy, a route selection policy, a slice selection policy, a work mode selection policy, a session continuity policy, and an information reporting policy. The network selection policy is a policy for the UE to select a type of access network, and the route selection policy is a policy for selecting a transmission route in a policy transmission process.

The slice selection policy is a policy for the UE to select a data slice. In one embodiment, the slice selection policy includes one or more of a trigger condition and a slice identifier. The trigger condition includes but is not limited to one or more of a designated location, a designated access network type, and a designated time period. The slice identifier is an identity of a data slice. When the trigger condition in the slice selection policy is satisfied, the UE accesses a corresponding slice based on the slice identifier. The UE may access a plurality of slices. For example, the trigger condition in the slice selection policy includes a designated location, a designated access network type, and a designated time period. If a current location of the UE, an identifier of a current access network, and a current time meet the trigger condition, the UE accesses a slice corresponding to the slice identifier.

The slice selection policy may also be a policy for selecting a data slice by an application installed on the UE. The slice selection policy may include one or more of a trigger condition of the slice selection policy, an application identifier, and a slice identifier. The trigger condition includes one or more of a designated location, a designated access network type, and a designated time period. The application identifier is an identity of the application installed on the UE. The slice identifier is an identity of a slice in a core network. If the UE satisfies the trigger condition in the slice selection policy, an application corresponding to the application identifier on the UE may access a data slice corresponding to the slice identifier. In one embodiment, the application may access a plurality of data slices.

The work mode selection policy is a policy for the UE to select a work mode. The work mode includes but is not limited to an Internet of things (IoT) mode and a mobile broadband (MBB) mode.

The session continuity policy is a policy for an application on the UE to select an SSC (session and service continuity) mode. In one embodiment, the session continuity policy includes one or more of a trigger condition, an application identifier, and an SSC mode identifier. The trigger condition includes one or more of a designated location, a designated access network type, and a designated time period. The application identifier is an identifier of an application installed on the UE. The SSC mode identifier is an identity of an SSC mode. If the UE satisfies the trigger condition in the session continuity policy, an application corresponding to the application identifier on the UE chooses to associate with an SSC mode corresponding to the SSC mode identifier.

The information reporting policy is a policy for the UE to report a report. In one embodiment, the information reporting policy includes one or more of a trigger condition, report content, a reporting frequency, and a reporting target. The reporting condition is a trigger condition for the UE to submit a report. The UE can submit a report only when the reporting condition is satisfied. The report content is information required by the UE when the UE collects the report. The collected information includes but is not limited to one or more of a speed, a temperature, a battery consumption speed, a memory usage ratio, and a CPU usage ratio. The reporting frequency is a quantity of times the UE submits reports within a designated time. The reporting target is a destination network element to which the report is sent.

For example, the sender carried in the policy is the NEF, and the receiver carried in the policy is the UE, the reporting condition carried in the policy is that the speed is less than 100 but not less than 10 and that the temperature is less than 60 but not less than 30, the report content is the battery consumption speed, the reporting frequency is 1 s, and the reporting target is the UDM.

Operation S402. The PCF sends the policy to an AN.

Operation S403. The AN delivers the policy to the UE, and the UE executes the policy after receiving the policy.

In one embodiment, the PCF may send the policy to the UE through a PDU session that is used to dedicatedly transmit policies. A specific process may be: A PDU session is established between the UE, the AN, and the UPF; the PCF sends the policy to the UPF; the UPF loads the policy to the PDU session and sends the session to the UE or the AN; and the UE or the AN executes the received policy.

In one embodiment, the PCF may add the policy to NAS signaling, and send the NAS signaling to the AMF; the AMF sends the NAS signaling to the UE through a control plane interface between the AMF and the UE, or the AMF sends the NAS signaling to the AN through a control plane interface between the AMF and the AN.

It should be noted that this embodiment of this disclosure is not limited to delivering the policy through a dedicated PDU session or dedicated NAS signaling, but may also deliver the policy through an IP protocol between the UE and the PCF in the prior art.

In this embodiment of this disclosure, the policy can be customized by a third party, thereby further improving efficiency and flexibility of policy delivery.

Figure 5:
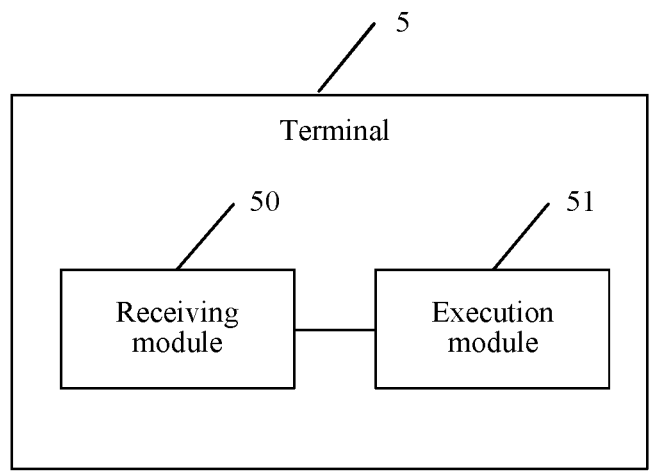
FIG. 5 is a schematic structural diagram of a terminal according to an embodiment of this disclosure.

FIG. 5 is a schematic structural diagram of a terminal according to an embodiment of this disclosure. The terminal 5 may include a receiving module 501 and an execution module 502, and units are described in detail below.

The receiving module 501 is configured to receive a policy sent by a policy control function PCF.

The execution module 502 is configured to execute the policy.

In one embodiment, the receiving module 501 is configured to:
receive the policy sent by the PCF through a dedicated transport channel.

In one embodiment, the dedicated transport channel is a protocol data unit PDU session or non-access stratum NAS signaling.

In one embodiment, the terminal 5 further includes:
an establishment module, configured to: trigger establishment of the dedicated transport channel, and determine the dedicated transport channel based on indication information sent by a session management function SMF.

In one embodiment, the policy includes one or more of a network selection policy, a route selection policy, a data slice selection policy, a work mode selection policy, a session continuity policy, and an information reporting policy.

In one embodiment, the execution module is specifically configured to:
obtain, by the UE if the policy is an information reporting policy, a reporting condition and report content included in the information reporting policy;
obtain a parameter value of the report content, and generate a report based on the parameter value; and
send the report to a network-side device, if the reporting condition is satisfied.

In one embodiment, the report content includes one or more of a terminal location, a speed, a hardware status, an application status, and a network resource occupation status.

In one embodiment, the policy is a slice selection policy, the slice selection policy includes a trigger condition and a slice identifier, and the trigger condition includes one or more of a designated location, a designated access network type, and a designated time period; and
the execution module 502 is further configured to:
access a slice corresponding to the slice identifier, if the trigger condition is satisfied.

In one embodiment, the policy is a slice selection policy, the slice selection policy includes a trigger condition, a slice identifier, and an application identifier, and the trigger condition includes one or more of a designated location, a designated access network type, and a designated time period; and
the execution module 502 is further configured to:
instruct, if the trigger condition is satisfied, an application corresponding to the application identifier to access a slice corresponding to the slice identifier.

In one embodiment, the policy is a session continuity policy, the session continuity policy includes a trigger condition, a session and service continuity SSC mode identifier, and an application identifier, and the trigger condition includes one or more of a designated location, a designated access network type, and a designated time period; and
the execution module 502 is further configured to:
instruct, by the UE if the trigger condition is satisfied, an application corresponding to the application identifier to associate with an SSC mode corresponding to the SSC mode identifier.

It should be noted that, for implementation of each unit, refer to the corresponding descriptions of the method embodiments shown in FIG. 2 to FIG. 4.

Figure 6:
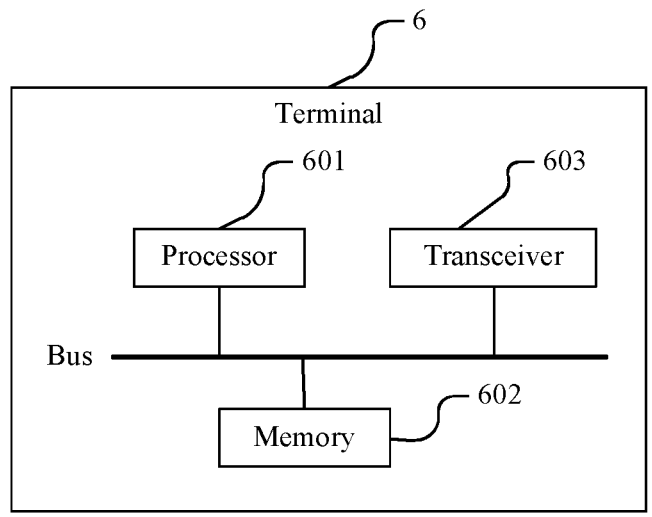
FIG. 6 is another schematic structural diagram of a terminal according to an embodiment of this disclosure.

FIG. 6 is a schematic structural diagram of a terminal according to an embodiment of this disclosure. The terminal 6 includes a processor 601, a memory 602, and a transceiver 603. The processor 601, the memory 602, and the transceiver 603 are connected to each other by using a bus.

The memory 602 may be, but is not limited to, a random access memory (RAM), a read-only memory (ROM), an erasable programmable read-only memory (EPROM), or a compact disc read-only memory (CD-ROM). The memory

602 is configured to store relevant instructions and data. The transceiver 603 is configured to receive and send data.

The processor 601 may be one or more central processing units (CPU). When the processor 601 is a CPU, the CPU may be a single-core CPU or may be a multi-core CPU.

The processor 601 is configured to read program code stored in the memory 602, and perform the following operations:
receiving, by using the transceiver 603, a policy sent by a policy control function PCF; and
executing the policy.

In one embodiment, the receiving, by the processor 601, a policy sent by a policy control function PCF includes:
receiving, by using the transceiver 603, the policy sent by the PCF through a dedicated transport channel.

In one embodiment, the dedicated transport channel is a protocol data unit PDU session or non-access stratum NAS signaling.

In one embodiment, before the receiving, a policy sent by a policy control function PCF, the processor 601 is further configured to:
trigger establishment of the dedicated transport channel, and determine the dedicated transport channel based on indication information sent by a session management function SMF.

In one embodiment, the policy includes one or more of a network selection policy, a route selection policy, a data slice selection policy, a work mode selection policy, a session continuity policy, and an information reporting policy.

In one embodiment, the executing, by the processor 601, the policy includes:
obtaining, if the policy is an information reporting policy, a reporting condition and report content included in the information reporting policy;
obtaining a parameter value of the report content, and generating a report based on the parameter value; and
sending, by using the transceiver 603, the report to a network-side device, if the reporting condition is satisfied.

In one embodiment, the report content includes one or more of a terminal location, a speed, a hardware status, an application status, and a network resource occupation status.

In one embodiment, the policy is a slice selection policy, the slice selection policy includes a trigger condition and a slice identifier, and the trigger condition includes one or more of a designated location, a designated access network type, and a designated time period; and
the executing, by the processor 601, the policy includes:
accessing a slice corresponding to the slice identifier, if the trigger condition is satisfied.

In one embodiment, the policy is a slice selection policy, the slice selection policy includes a trigger condition, a slice identifier, and an application identifier, and the trigger condition includes one or more of a designated location, a designated access network type, and a designated time period; and
the executing, by the processor 601, the policy includes:
instructing, if the trigger condition is satisfied, an application corresponding to the application identifier to access a slice corresponding to the slice identifier.

In one embodiment, the policy is a session continuity policy, the session continuity policy includes a trigger condition, a session and service continuity SSC mode identifier, and an application identifier, and the trigger condition includes one or more of a designated location, a designated access network type, and a designated time period; and
the executing, by the processor 601, the policy includes:
instructing, if the trigger condition is satisfied, an application corresponding to the application identifier to associate with an SSC mode corresponding to the SSC mode identifier.

By implementing the foregoing embodiment, the PDU session that is used to dedicatedly transmit a policy and a report is established between UE, an AN, and a core-network network element to share a transport channel. In addition, the AN participates in formulation of the policies, and, can receive, through a non-control plane, the reports sent by the UE, thereby improving efficiency and flexibility of policy delivery and report reporting.

Figure 7:
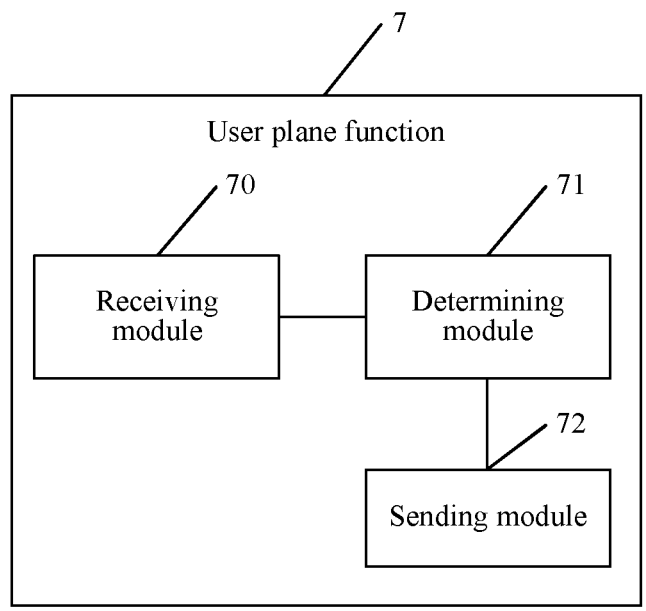
FIG. 7 is a schematic structural diagram of a user plane function according to an embodiment of this disclosure.

FIG. 7 is a schematic structural diagram of a core-network network element according to an embodiment of the present disclosure. The core-network network element 7 is a user plane function, and the user plane function 7 may include a receiving module 701, a determining module 702, and a sending module 703. The units are described in detail below.

The receiving module 701 is configured to receive a policy of user equipment UE sent by a policy control function PCF.

The determining module 702 is configured to determine a dedicated transport channel.

The sending module 703 is configured to load the policy to the dedicated transport channel and send the channel to the UE.

In one embodiment, the determining module 702 is configured to:
determine the dedicated transport channel based on indication information sent by an SMF.

In one embodiment, the user plane function further includes:
a forwarding module, configured to extract, from the dedicated transport channel, a report reported by the UE; and
forward the report to unified data management UDM; or
forward the report to the policy control function PCF by using the session management function SMF; or
forward the report to the policy control function PCF.

In one embodiment, the policy includes one or more of a network selection policy, a route selection policy, a slice selection policy, a work mode selection policy, a session continuity policy, and an information reporting policy.

It should be noted that, for implementation of each unit, refer to the corresponding descriptions of the method embodiments shown in FIG. 2 to FIG. 4.

Figure 8:
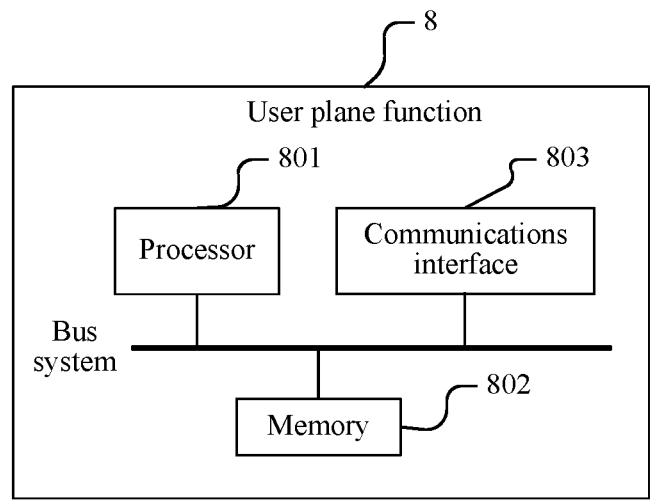
FIG. 8 is another schematic structural diagram of a user plane function according to an embodiment of this disclosure.

FIG. 8 is a schematic structural diagram of a core-network network element according to an embodiment of this disclosure. The core-network network element is a user plane function, and the user plane function 8 includes a processor 801, a memory 802, and a communications interface 803. The processor 801, the memory 802, and the communications interface 803 are connected to each other by using a bus.

The memory 802 may be, but is not limited to, a random access memory (RAM), a read-only memory (ROM), an erasable programmable read-only memory (EPROM), or a compact disc read-only memory (CD-ROM). The memory 802 is configured to store relevant instructions and data.

The processor 801 may be one or more central processing units (CPU). When the processor 801 is a CPU, the CPU may be a single-core CPU or may be a multi-core CPU.

The processor 801 is configured to read program code stored in the memory 802, and perform the following operations:

receiving, by using the communications interface 803, a policy of user equipment UE sent by a policy control function PCF;

determining a dedicated transport channel; and loading the policy to the dedicated transport channel and sending the channel to the UE.

In one embodiment, the determining, by the processor 801, a dedicated transport channel includes:

determining the dedicated transport channel based on indication information sent by an SMF.

In one embodiment, the processor 801 is further configured to:

extract, from the dedicated transport channel, a report reported by the UE;

forward the report to unified data management UDM; or forward the report to the policy control function PCF by using the session management function SMF; or forward the report to the policy control function PCF.

In one embodiment, the policy includes one or more of a network selection policy, a route selection policy, a slice selection policy, a work mode selection policy, a session continuity policy, and an information reporting policy.

By implementing the foregoing embodiment, the PDU session that is used to dedicatedly transmit a policy and a report is established between UE, an AN, and a core-network network element to share a transport channel. In addition, the AN participates in formulation of the policies, and can receive, through a non-control plane, the reports sent by the UE, thereby improving efficiency and flexibility of policy delivery and report reporting.

Figure 9A:
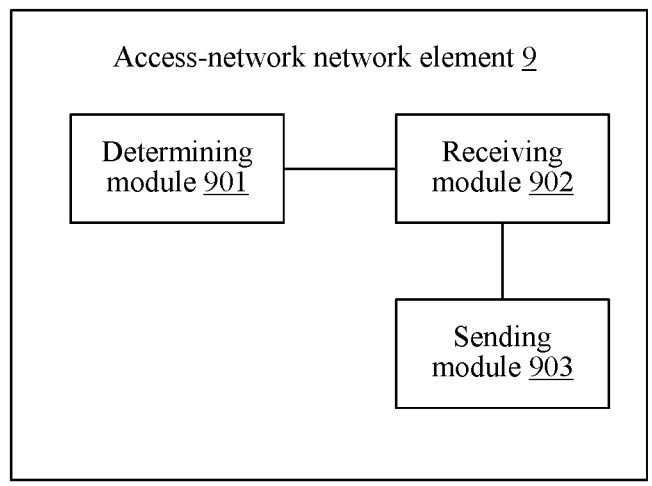
FIG. 9a is a schematic structural diagram of an access-network network element according to an embodiment of this disclosure.

FIG. 9a is a schematic structural diagram of an access-network network element according to an embodiment of this disclosure. The access-network network element 9 may include a determining module 901, a receiving module 902, and a sending module 903. The units are described in detail below.

The determining module 901 is configured to determine a dedicated transport channel.

The receiving module 902 is configured to receive a policy of UE that is delivered by a core-network network element through the dedicated transport channel.

The sending module is configured to send the policy to the UE through the dedicated transport channel.

In one embodiment, the determining module 901 is configured to:

determine the dedicated transport channel based on indication information sent by an AMF.

In one embodiment, the dedicated transport channel includes a PDU session or NAS signaling.

In one embodiment, the access-network network element 9 further includes:

an extraction module, configured to receive a report that is sent by the UE through the dedicated transport channel, where the report includes at least one network element identifier and a parameter value associated with each network element identifier; and extract, from the report, a parameter value associated with an identifier of the AN.

In one embodiment, the access-network network element 9 further includes:

a forwarding module, configured to: if the at least one network element identifier includes another network element identifier other than the identifier of the AN, send the report to a network element indicated by the another network element identifier.

Figure 9B:
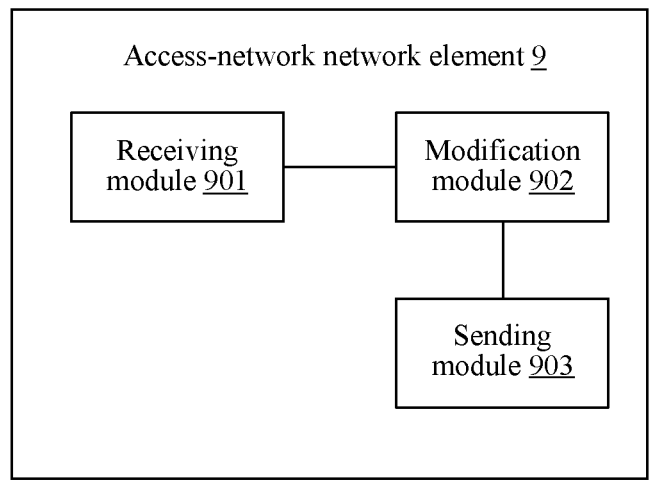
FIG. 9b is another schematic structural diagram of an access-network network element according to an embodiment of this disclosure.

FIG. 9b is a schematic structural diagram of an access-network network element according to an embodiment of this disclosure. The access-network network element may include a receiving module 901, a modification module 902, and a sending module 903.

The receiving module 901 is configured to receive a policy of UE that is delivered by a core-network network element through the dedicated transport channel.

The modification module 902 is configured to modify the policy.

The sending module is configured to deliver the modified policy to the UE through the dedicated transport channel.

In one embodiment, the dedicated transport channel includes a PDU session or NAS signaling.

In one embodiment, the access-network network element further includes:

an extraction module, configured to receive a report that is sent by the UE through the dedicated transport channel, where the report includes at least one network element identifier and a parameter value associated with each network element identifier; and extract, from the report, a parameter value associated with an identifier of the AN.

In one embodiment, the access-network network element further includes:

a forwarding module, configured to: if the at least one network element identifier includes another network element identifier other than the identifier of the AN, send the report to a network element indicated by the another network element identifier.

It should be noted that, for implementation of each unit, refer to the corresponding descriptions of the method embodiments shown in FIG. 2 to FIG. 4.

Figure 10:
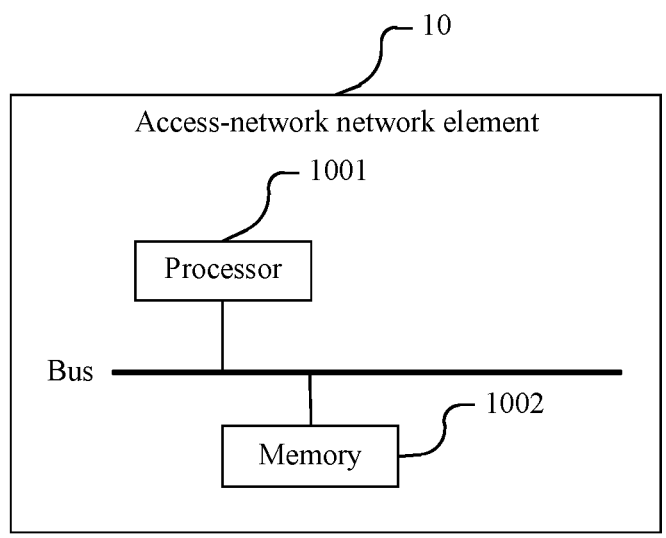
FIG. 10 is another schematic structural diagram of an access-network network element according to an embodiment of this disclosure.

FIG. 10 is a schematic structural diagram of an access-network network element according to an embodiment of this disclosure. The access-network network element 10 includes a processor 1001, a memory 1002, and a transceiver 1003. The processor 1001 and the memory 1002 are connected to each other by using a bus.

The memory 1002 may be, but is not limited to, a random access memory (RAM), a read-only memory (ROM), an erasable programmable read-only memory (EPROM), or a compact disc read-only memory (CD-ROM). The memory 1002 is configured to store relevant instructions and data.

The processor 1001 may be one or more central processing units (CPU). When the processor 1001 is a CPU, the CPU may be a single-core CPU or may be a multi-core CPU.

The processor 1001 is configured to read program code stored in the memory 1002, and perform the following operations:

determining a dedicated transport channel;

receiving a policy of UE that is delivered by a core-network network element through the dedicated transport channel;

sending the policy to the UE through the dedicated transport channel; or receiving a policy of UE that is delivered by a core-network network element through the dedicated transport channel;

modifying the policy; and delivering the modified policy to the UE through the dedicated transport channel.

In one embodiment, the determining, by the processor 1001, a dedicated transport channel includes:

determining the dedicated transport channel based on indication information sent by an AMF.

In one embodiment, the dedicated transport channel includes a PDU session or NAS signaling.

In one embodiment, the processor 1001 is further configured to:
receive a report that is sent by the UE through the dedicated transport channel, where the report includes at least one network element identifier and a parameter value associated with each network element identifier; and
extract, from the report, a parameter value associated with an identifier of the AN.

In one embodiment, the processor 1001 is further configured to:
if the at least one network element identifier includes another network element identifier other than the identifier of the AN, send the report to a network element indicated by the another network element identifier.

By implementing the foregoing embodiment, the PDU session that is used to dedicatedly transmit a policy and a report is established between the UE, the AN, and the core-network network element to share a transport channel. In addition, the AN participates in formulation of the policies, and can receive, through a non-control plane, the reports sent by the UE, thereby improving efficiency and flexibility of policy delivery and report reporting.

Figure 11:
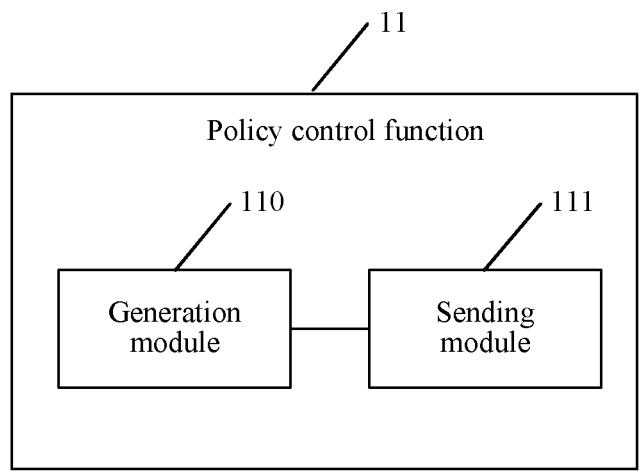
FIG. 11 is a schematic structural diagram of a policy control function according to an embodiment of this disclosure.

FIG. 11 is a schematic structural diagram of a core-network network element according to an embodiment of this disclosure. The core-network network element is a policy control function, and the policy control function 11 may include a generation module 1101 and a sending module 1102. The units are described in detail below.

The generation module 1101 is configured to generate a policy of user equipment UE.

The sending module 1102 is configured to: send the policy to a user plane function UPF, and instruct the UPF to load the policy to a dedicated transport channel and send the channel to the UE or an access network AN; or
send the policy to an access management function AMF, and instruct the AMF to forward the policy to the UE or the AN by using non-access stratum NAS signaling.

In one embodiment, the generation module 1101 is configured to:
receive a policy customized by a network exposure function NEF;
receive a policy customized by an application function AF;
receive a policy customized by unified data management UDM; or
receive a policy customized by a session management function SMF.

It should be noted that, for implementation of each unit, refer to the corresponding descriptions of the method embodiments shown in FIG. 2 to FIG. 4.

Figure 12:
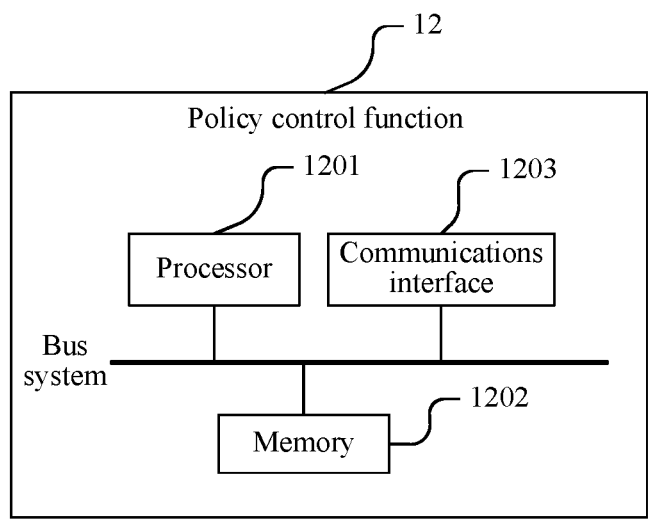
FIG. 12 is another schematic structural diagram of a policy control function according to an embodiment of this disclosure.

FIG. 12 is a schematic structural diagram of a core-network network element according to an embodiment of this disclosure. The core-network network element is a policy control function, and the policy control function 12 includes a processor 1201, a memory 1202, and a communications interface 1203. The processor 1201, the memory 1202, and the communications interface 1203 are connected to each other by using a bus.

The memory 1202 may be, but is not limited to, a random access memory (RAM), a read-only memory (ROM), an erasable programmable read-only memory (EPROM), or a compact disc read-only memory (CD-ROM). The memory 1202 is configured to store relevant instructions and data.

The processor 1201 may be one or more central processing units (CPU). When the processor 1201 is a CPU, the CPU may be a single-core CPU or may be a multi-core CPU.

The processor 1201 is configured to read program code stored in the memory 1202, and perform the following operations:
generating a policy of user equipment UE; and
sending the policy to a user plane function UPF, and instructing the UPF to load the policy to a dedicated transport channel and send the channel to the UE or an access network AN; or
sending the policy to an access management function AMF, and instructing the AMF to forward the policy to the UE or the AN through non-access stratum NAS signaling.

In one embodiment, the generating, by the processor 1201, a policy of user equipment UE includes:
receiving a policy customized by a network exposure function NEF;
receiving a policy customized by an application function AF;
receiving a policy customized by a unified data management UDM function; or
receiving a policy customized by a session management function SMF.

By implementing the foregoing embodiment, the PDU session that is used to dedicatedly transmit a policy and a report is established between the UE, the AN, and the core-network network element to share a transport channel. In addition, the AN participates in formulation of the policies, and can receive, through a non-control plane, the reports sent by the UE, thereby improving efficiency and flexibility of policy delivery and report reporting.

A person of ordinary skill in the art may understand that all or some of the processes of the methods in the embodiments may be implemented by a computer program instructing relevant hardware. The program may be stored in a computer readable storage medium. When the program is run, the processes of the methods in the embodiments are performed. The foregoing storage medium includes: any medium that can store program code, such as a ROM, a RAM, a magnetic disk, or an optical disc.

What is claimed is:

1. A data transmission method, comprising:
receiving, by a policy client of a terminal, non-access stratum (NAS) signaling from a policy control function (PCF) through an access and mobility management function (AMF) and a control plane interface between the AMF and the terminal, the NAS signaling comprising a slice selection policy,
the terminal comprising an application layer, an operating system, and a hardware layer, wherein the policy client is disposed on the hardware layer, and the slice selection policy comprises a trigger condition, a slice identifier, and an application identifier corresponding to an application in the application layer; and
accessing, by the application, a slice corresponding to the slice identifier when the trigger condition is satisfied.

2. The method according to claim 1, wherein the trigger condition comprises one or more of a designated location or a designated time period.

3. An apparatus, comprising an application layer, an operating system, and a hardware layer; wherein a policy client is disposed on the hardware layer, wherein the hardware layer further comprises:
a processor; and
a memory coupled with the processor, wherein the memory stores instructions, which when executed by the processor, causes the apparatus to:

receive non-access stratum (NAS) signaling from a policy control function (PCF) through an access and mobility management function (AMF) and a control plane interface between the AMF and the apparatus, wherein the NAS signaling comprises a slice selection policy, wherein the slice selection policy comprises a trigger condition, a slice identifier, and an application identifier corresponding to an application in the application layer; and wherein the application in the application layer is configured to access a slice corresponding to the slice identifier in the case that the trigger condition is satisfied.

4. The apparatus according to claim 3, wherein the trigger condition comprises one or more of a designated location or a designated time period.

\* \* \* \* \*